US012771202B2

(12) United States Patent
White et al.

(10) Patent No.: US 12,771,202 B2
(45) Date of Patent: Oct. 20, 2026

(54) SEAL FOR LINEAR ACTUATOR

(71) Applicant: Schaeffler Technologies AG & Co. KG, Herzogenaurach (DE)

(72) Inventors: Carl White, Rock Hill, SC (US); Peter Keller, Bruchmühlbach-Miesau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 199 days.

(21) Appl. No.: 18/662,264

(22) Filed: May 13, 2024

(65) Prior Publication Data

US 2024/0413701 A1 Dec. 12, 2024

Related U.S. Application Data

(60) Provisional application No. 63/472,086, filed on Jun. 9, 2023.

(51) Int. Cl.

*H02K 5/10* (2006.01)
*F16J 15/38* (2006.01)
*H02K 41/02* (2006.01)

(52) U.S. Cl.

CPC ................ *H02K 5/10* (2013.01); *F16J 15/38* (2013.01); *H02K 41/02* (2013.01)

(58) Field of Classification Search

CPC ............. H02K 5/10; H02K 41/02; F16J 15/38
USPC .......................................... 310/12.33, 89, 90
See application file for complete search history.

(56) References Cited

U.S. PATENT DOCUMENTS 6,772,653 B1 * 8/2004 Franksson ............. E05F 15/622 74/89.36
8,025,492 B2 * 9/2011 Seibel ................... F04C 29/124 418/55.4
8,506,271 B2 8/2013 Seibel et al.
10,995,753 B2 * 5/2021 Berning .............. F04C 18/0253
11,754,072 B2 * 9/2023 Doepker ................. F04C 28/10 418/22
2002/0184853 A1 * 12/2002 Arrant ................... B65B 7/2835 53/343
2007/0045068 A1 * 3/2007 Namuduri ............... F16F 9/535 188/267
2007/0272077 A1 * 11/2007 Perkins ............... F15B 15/1461 92/161
2009/0260463 A1 * 10/2009 Fukano .................. H02K 7/116 74/89.33

(Continued)

FOREIGN PATENT DOCUMENTS

EP 2357385 A1 8/2011
EP 2505445 A1 10/2012
WO 2021112989 A1 6/2021

OTHER PUBLICATIONS

Source: International Search Report and Written Opinion for PCT/US2024/030463, dated Sep. 13, 2024, 8 Pages.

(Continued)

*Primary Examiner* — Rashad H Johnson

(57) ABSTRACT

A linear actuator includes an outer housing, an inner arm disposed within and extending from an open end of the outer housing, and a seal arranged radially between the outer housing and the inner arm so as to prevent passage of fluid and particle contamination between the outer housing and the inner arm. The seal includes a first seal, a second seal, and a felt ring configured to sealingly engage the inner arm.

19 Claims, 4 Drawing Sheets

(56) References Cited

U.S. PATENT DOCUMENTS

2014/0300228 A1* 10/2014 Rapp ........................ F16H 25/20 310/80
2014/0300253 A1* 10/2014 Rapp ........................ H02K 7/06 310/68 B
2015/0211639 A1* 7/2015 Grimanis ............... F16J 15/164 277/303
2016/0237838 A1* 8/2016 Kennedy ................... F02C 6/12
2016/0290477 A1* 10/2016 Hogberg ................. F16H 25/20
2016/0298754 A1* 10/2016 Högberg ............. F16H 57/0497
2016/0356367 A1* 12/2016 Högberg .................. H02K 7/06
2019/0211907 A1* 7/2019 Franksson ............... F16H 25/20
2019/0226504 A1 7/2019 Richter et al.
2019/0352978 A1* 11/2019 Gherardi ................. E21B 19/07
2020/0056689 A1* 2/2020 Lawlor ................... F16N 11/08
2021/0054931 A1 2/2021 Alger et al.
2021/0364070 A1* 11/2021 Keranen ............. F16H 25/2252
2021/0401487 A1* 12/2021 Apostolopoulos ........................... A61B 18/1445
2021/0401513 A1* 12/2021 Apostolopoulos ..... A61B 34/30
2022/0196124 A1* 6/2022 Worden ................ F16H 57/029
2022/0389991 A1* 12/2022 Würl ................... F16H 25/2209
2024/0117827 A1* 4/2024 Knoell .................... F15B 21/14
2024/0421530 A1* 12/2024 Nicholson ............ H01R 13/523
2025/0010978 A1* 1/2025 Nozka ................. F16H 25/2015
2025/0012354 A1* 1/2025 Nozka ................. F16H 57/0497
2025/0257804 A1* 8/2025 Landacre ............ F16K 31/0627
2025/0283528 A1* 9/2025 Resh .................. F16H 25/2204

OTHER PUBLICATIONS

Source: International Preliminary Report on Patentability Corresponding to International application No. PCT/US2024/030463, dated Dec. 18, 2025, 7 Pages.

* cited by examiner

SEAL FOR LINEAR ACTUATOR

CROSS-REFERENCE TO RELATED APPLICATIONS

This application claims priority to U.S. Provisional Application 63/472,086 filed Jun. 9, 2023, the entire disclosure of which is incorporated by reference herein.

TECHNICAL FIELD

This disclosure is generally related to a seal for a linear actuator.

BACKGROUND

Linear actuators can incorporate electromechanical, piezoelectric, pneumatic, or hydraulic means of linearly extending a rod or tube from a housing. Linear actuators can be used in a variety of applications and environments to move a component to a desired location or position. For outdoor and industrial working environments, fluid and particle contamination ingress should be prevented to ensure long life of a linear actuator.

SUMMARY

Embodiments of the present disclosure provide a linear actuator that includes an outer housing, an inner arm, a first seal, a felt ring, and a second seal. The inner arm is disposed within the outer housing and configured to be reciprocatingly movable relative to the outer housing. The first seal, felt ring, and the second seal can be configured to sealingly engage the inner arm. The felt ring can be arranged axially between the first seal and the second seal. The first seal can be a first lip seal and the second seal can be a second lip seal.

In an example embodiment, the second seal is not fixed to the outer housing and is configured as a radially floating seal; in a further aspect the second seal is configured as an axially floating seal.

In an example embodiment, the first seal is fixed to the outer housing.

In an example embodiment, the outer housing includes a separate end cap fixed to an end of the outer housing, and the first seal, the felt ring, and the second seal are disposed between the separate end cap and the inner arm. In a further aspect, the separate end cap comprises a bearing configured to slidably receive the inner arm, and the bearing is arranged adjacently to the first seal.

In an example embodiment, the separate end cap includes a stepped bore having a first radial surface, a second radial surface, a first axial surface and a second axial surface. In a further aspect, the first seal is disposed axially between the bearing and the first axial surface, and the second seal is disposed axially between the felt ring and the second axial surface. The second axial surface can be configured to provide axial retainment of the second seal.

In an example embodiment, the inner arm extends from an open end of the outer housing. In a further aspect, the inner arm and the outer housing define an effective length that can be selectively varied via an electric motor disposed within the outer housing.

In an example embodiment, an entirety of the second seal is configured to float radially relative to the outer housing.

In an example embodiment, the linear actuator includes a spring element separate from the first seal and the second seal and axially arranged between the first seal and the second seal. The spring element can springably support the second seal such that the entirety of the second seal floats axially relative to the outer housing via the spring element. Additionally, the spring element can slidably and sealingly engage the inner arm and also directly engage one or both of the first seal and the second seal.

In an example embodiment, the linear actuator is configured to adjust a tilt angle of a solar panel.

In an example embodiment, the electric motor is configured to move the inner arm via a threaded interface.

In an example embodiment, the linear actuator includes a displacement axis and a line extending parallel and offset from the displacement axis. The line passes consecutively through the first seal, the spring element, and the second seal.

In an example embodiment, the linear actuator includes an electromechanical powertrain that is disposed within the outer housing and is configured to convert rotary motion of an actuator to linear motion of the inner arm.

In an example embodiment, the second seal is configured to move axially and radially relative to the outer housing such that a first side of the second lip seal is axially retained by the outer housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
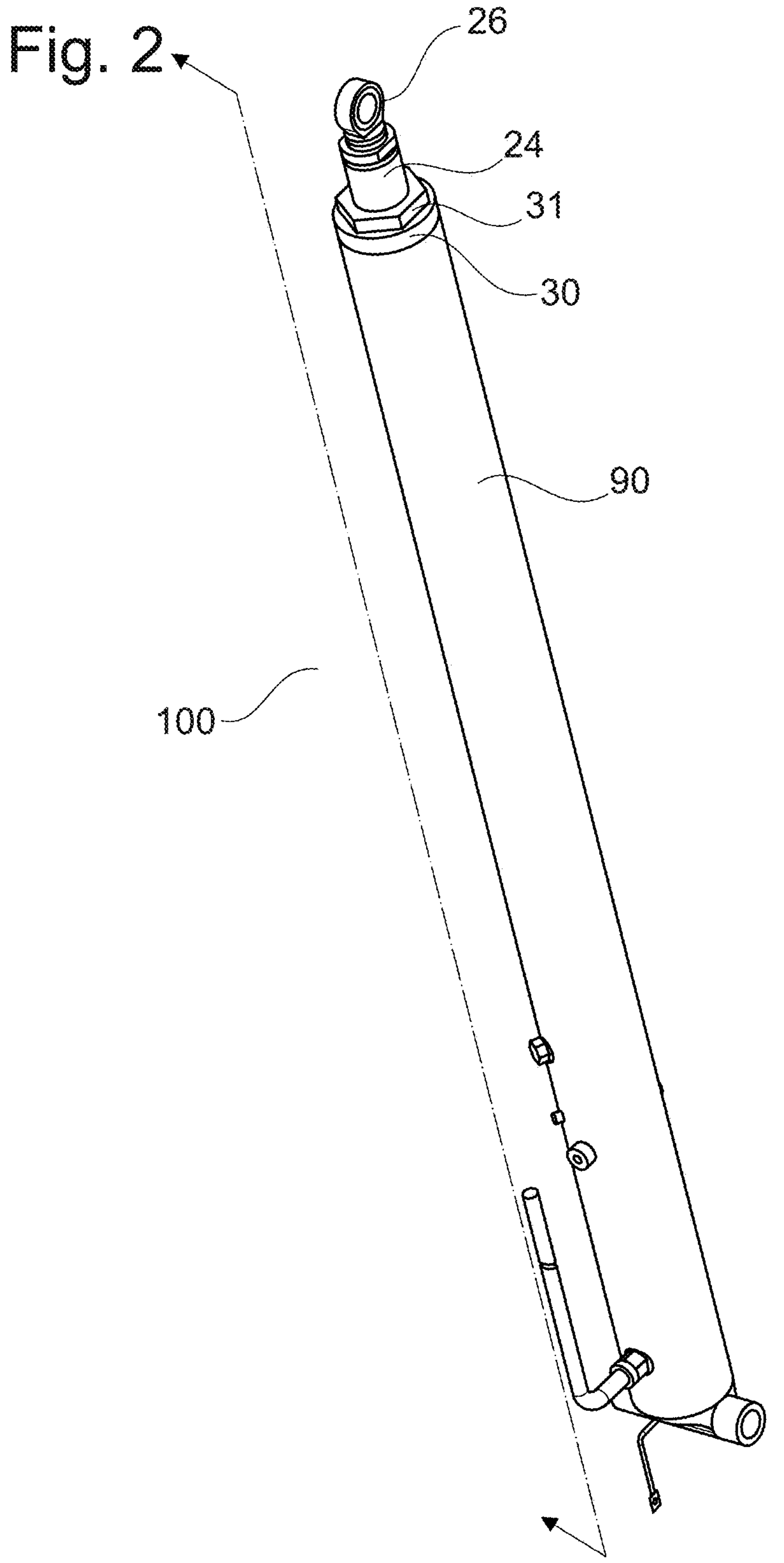
FIG. 1 shows a perspective view of an example embodiment of a linear actuator.
Figure 2:
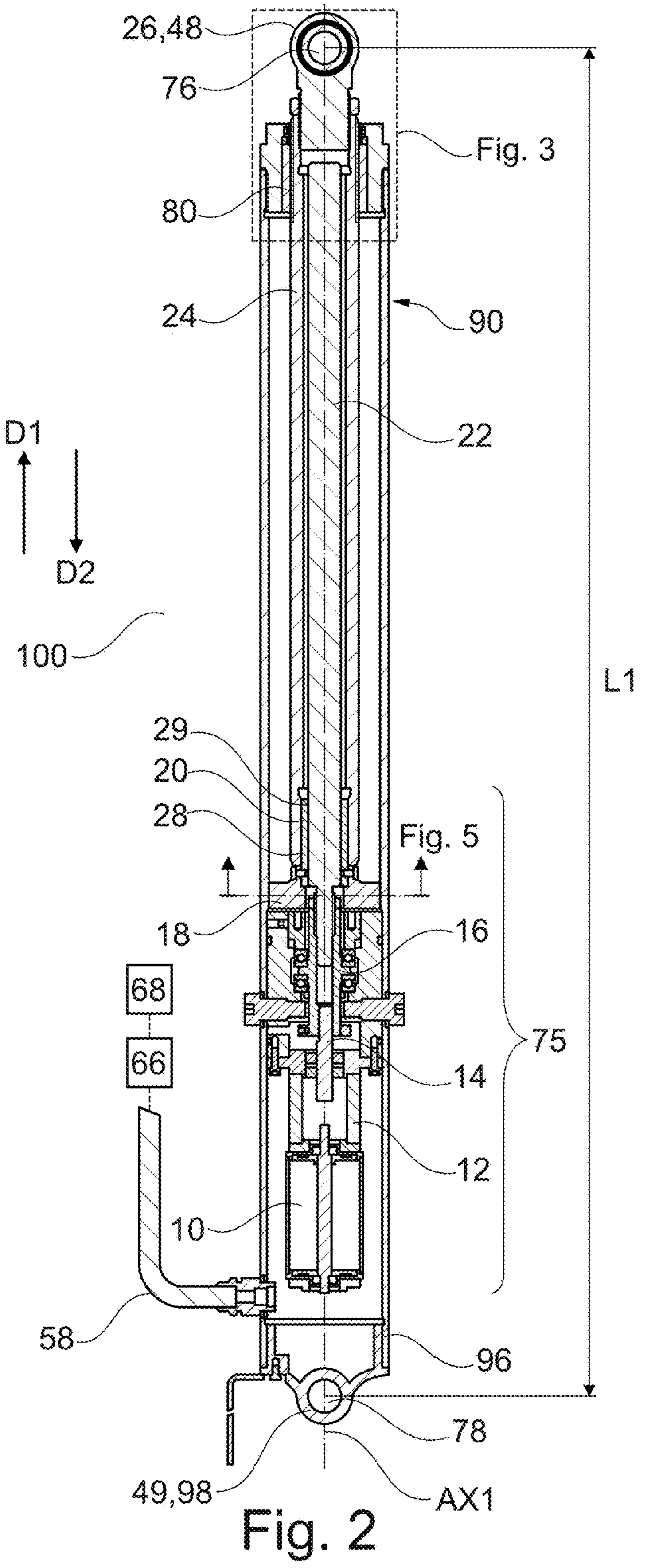
FIG. 2 shows a cross-sectional view taken from FIG. 1.
Figure 3:
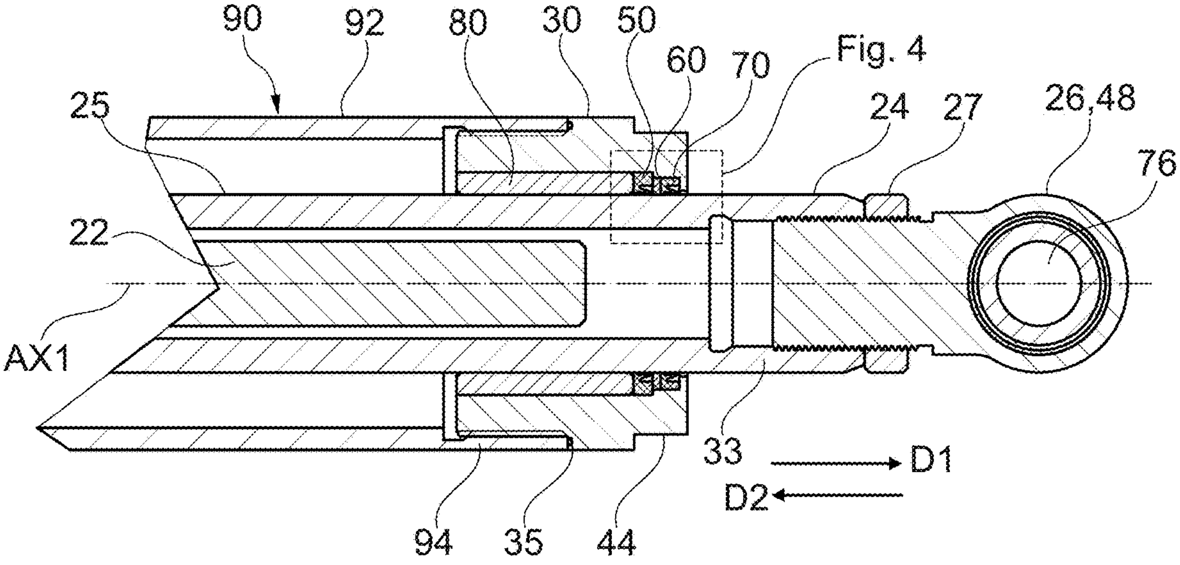
FIG. 3 shows a detailed view taken from FIG. 2.
Figure 4:
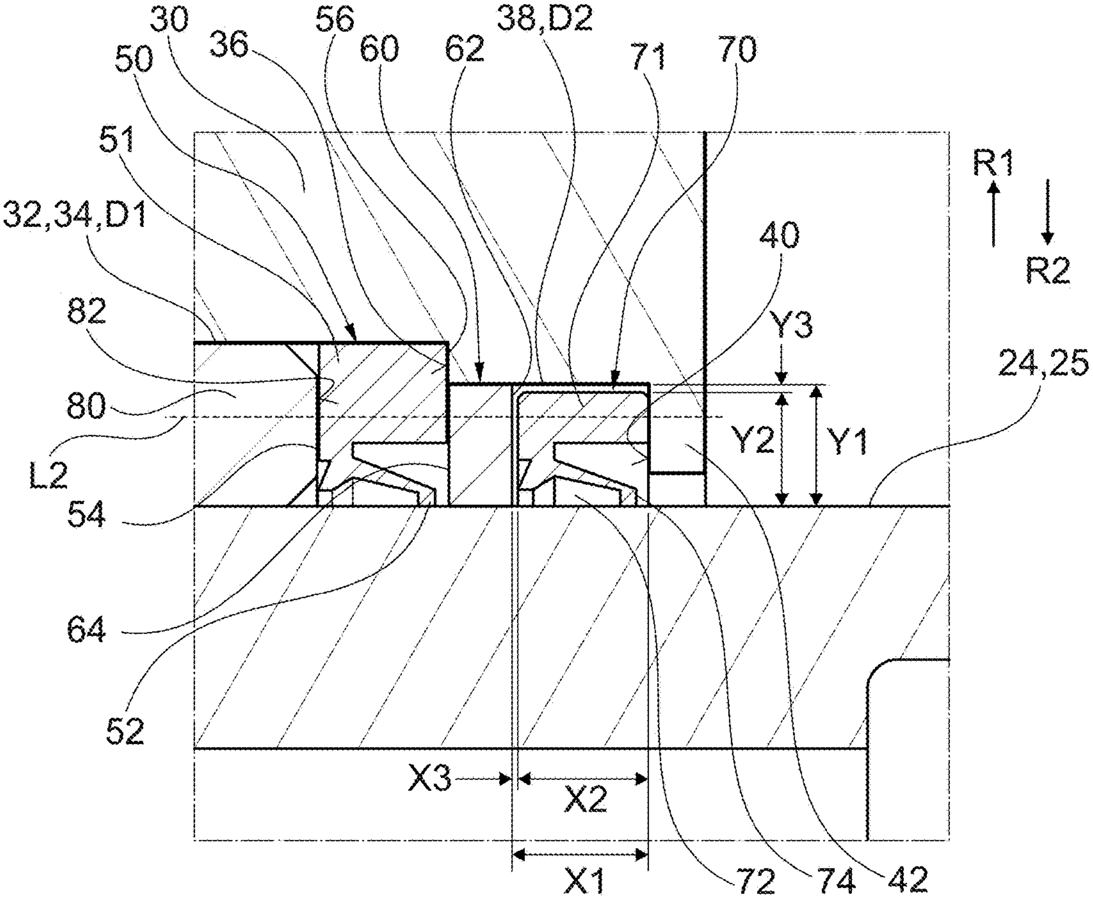
FIG. 4 shows a detailed view taken from FIG. 3.
Figure 5:
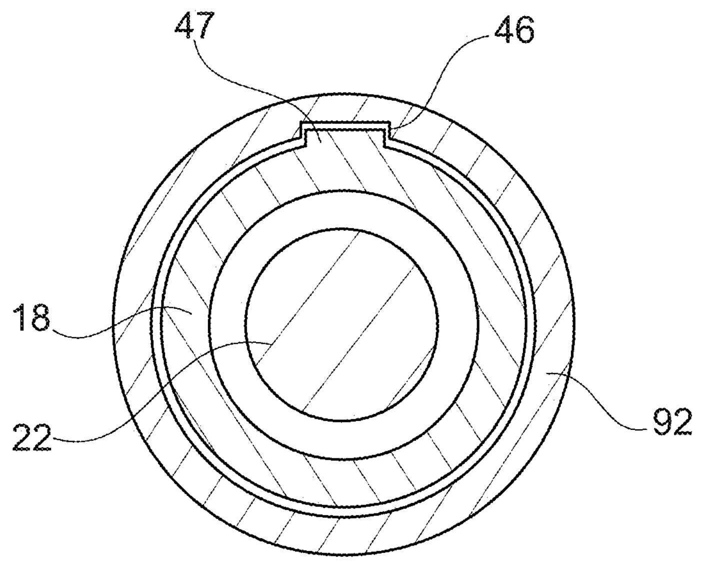
FIG. 5 shows a cross-sectional view taken from FIG. 2.
Figure 6:
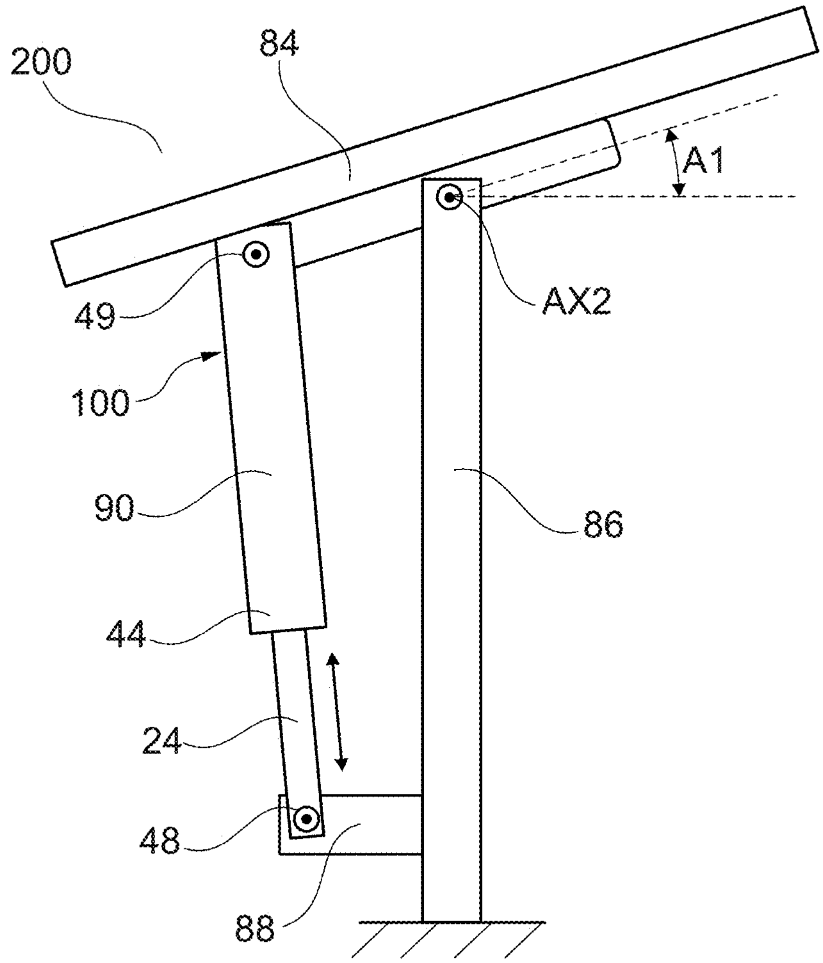
FIG. 6 shows a side view of an example embodiment of a solar panel arrangement that includes the linear actuator of FIG. 1.

FIG. 1 shows a perspective view of an example embodiment of a linear actuator 100. FIG. 2 shows a cross-sectional view taken from FIG. 1. FIG. 3 shows a detailed view taken from FIG. 2. FIG. 4 shows a detailed view taken from FIG. 3. FIG. 5 shows a cross-sectional view taken from FIG. 2. FIG. 6 shows a side view of an example embodiment of a solar panel arrangement 200 that includes the linear actuator 100 of FIG. 1. The following should be read in light of FIGS. 1 through 6.

The linear actuator 100 includes an outer tube assembly 90 that houses an electromechanical powertrain 75 to actuate or extend an inner arm 24 from an end 44 of the outer tube assembly 90. The outer tube assembly 90 includes an outer tube 92 and a separate first end cap 30 that is fixed to the outer tube. The outer tube 92 or outer housing is round as the name implies but could be any suitable hollow shape. The inner arm 24 includes a spherical rod end 26 that is fixed to an end 33 of the inner arm 24 via threads and a retaining nut 27. The spherical rod end 26 connects to a component to be actuated, such as a solar panel, or any other suitable component that requires selective linear movement. The inner arm 24 is partially enclosed by the outer tube assembly 90 and also extends outside of the outer tube assembly 90. The electromechanical powertrain 75 includes an electric motor 10 or actuator that provides a rotatable input to a speed reducer 12 (for example, a gearbox), which, in turn, drives a drive shaft 14. The drive shaft 14 is fixed to a threaded lead screw 22 via a coupling 16. The lead screw 22 is threadably coupled to a threaded nut 20 via a threaded interface 29 that converts rotary motion of the lead screw 22 to linear motion of the threaded nut 20. The threaded nut 20 is secured to an inner bore of the inner arm 24 via a threaded interface 28; other suitable means of securing the threaded nut 20 to the inner arm 24 are also possible, including, but not limited to an interference fit.

Selective rotation of the lead screw 22 by the electric motor 10 causes linear or axial displacement of the inner arm 24 in either a first axial direction D1 or a second axial direction D2 along an axis AX1, which serves as both a rotational axis and a displacement axis. Thus, rotation of the lead screw 22 causes the inner arm 24 to reciprocate relative to the outer tube 92 such that the inner arm 24 extends or retracts relative to the end 44 of the outer tube assembly 90. It could be stated that the action of the inner arm 24 relative to the outer tube assembly 90 is like that of a telescope.

In an example embodiment, the inner arm 24 moves in either the first axial direction D1 or the second axial direction D2 relative to the outer tube assembly 90 without rotating relative to the outer tube assembly 90. Such anti-rotation can be accomplished via the "fixed" state of a component or components that are secured to the first connector 48 or second connector 49 of the linear actuator 100. Alternatively, an optional anti-rotation collar 18 can be fixed to the threaded nut 27. In an example embodiment, a protrusion 47 of the anti-rotation collar 18 is slidably engaged with a keyway 46 of the outer tube 92 to prevent rotation of the inner arm 24 throughout its linear stroke. Other suitable anti-rotation designs or devices could also be applied.

The electric motor 10 is selectively energized via an electrical conduit 58 attached to the outer tube 92 of the outer tube assembly 90 that houses electrical wires that connect the electric motor 10 to a power source 68 via an electronic control unit 66.

A first end cap 30 is threadably and sealingly (via an o-ring 35) attached to a first open end 94 of the outer tube 92 and extends from the first open end 94 in the first axial direction D1. Other suitable means of attaching the first end cap housing 30 are also possible. The inner arm 24 extends through the first end cap 30, thus, the first end cap 30 can be described as an open end cap. The first end cap 30 radially surrounds or houses a composite bushing 80, a first seal 50, a felt ring 60, and a second seal 70. The composite bushing 80 is attached to the first end cap 30 via press-fit or any other suitable method. The composite bushing 80 functions as a plain bearing for the inner arm 24, slidably guiding the inner arm 24 throughout its reciprocating linear motion.

The first end cap 30 includes a stepped bore 32 that has a first radial surface 34, a first axial surface 36, a second radial surface 38, and a second axial surface 40. The first radial surface 34 is arranged radially outwardly of the second radial surface 38; or, alternatively stated, a diameter C1 of the stepped bore 32 that is defined by the first radial surface 34 is larger than a diameter C2 of the stepped bore 32 that is defined by the second radial surface 38. The first radial surface 34 surrounds or houses the composite bushing 80. The second axial surface 38 is defined by a radial inward protrusion 42 formed on the end 44 of the first end cap 30, which also serves as a first end of the outer tube assembly 90.

A first seal 50 is mounted or fixed to the first radial surface 34 and is further axially surrounded by the first axial surface 36 and a first axial end face 82 of the composite bushing 80. In an example embodiment, the first seal 50 is fixed to the first end cap 30 via axial clamping that occurs via the composite bushing and the first axial surface 36. In an example embodiment, a first axial end 54 of the first seal 50 directly abuts with the first axial end face 82 and the first axial surface 36 directly abuts with a second axial end 56 of the first seal 50. In an example embodiment, the first seal 50 includes a mountable body 51 and a deflectable first annular lip 52 that extends circumferentially and continuously for 360 degrees. The mountable body 51 can be constructed of an elastomer, metal, a combination of metal or elastomer, or any suitable material and/or construction that facilitates fixing the first seal 50 to the first end cap 30. In an example embodiment, the mountable body 51 is mounted or fixed to the first radial surface 34 via an interference or press fit. In an example embodiment, the deflectable first annular lip 52 extends radially inwardly from the mountable body 51 so that it sealingly and slidably contacts a radial outer surface 25 of the arm 24 as the arm reciprocates relative to the outer tube assembly 90. In an example embodiment, the deflectable first annular lip 52 has a resilient characteristic so that it springably engages the radial outer surface 25 of the arm 24. The deflectable first annular lip 52 can be constructed of any suitable material, including, but not limited to an elastomer or polymer.

A second seal 70 is disposed in a space 72 or cavity defined by a first axial side 62 of the felt ring 60, the second radial surface 38, and the second axial surface 40. In an example embodiment, the second seal 70 includes a body 71 and a deflectable second annular lip 74 that extends circumferentially for 360 degrees. The body 71 can be constructed of an elastomer, metal, a combination of metal or elastomer, or any suitable material and/or construction. In an example embodiment, and the deflectable second annular lip 74 extends radially inwardly from the body 71 so that it sealingly and slidably contacts the radial outer surface 25 of the arm 24. In an example embodiment, the deflectable second annular lip 74 has a resilient characteristic so that it springably engages the radial outer surface 25 of the arm. In an example embodiment, the second seal 70 is a floating seal, facilitated by a loose fit between the second seal 70 and the space 72 into which it is disposed. An axial length X1 of the space 72 is greater than an axial length X2 of the second seal 70, a difference defined by an axial gap X3. A radial height Y1 of the space 72 is greater than a radial height Y2 of the second seal 70, a difference defined by a radial gap Y3. The term "floating seal" is meant to signify that no portion of the second seal 70 is fixed to the first end cap 30 or the outer tube 92 so that it can move: i) in either the first axial direction D1 or the second axial direction D2 within the space 72, and ii) in either a first radial direction R1 or a second radial direction R2 within the space 72. In an example embodiment, an entirety of the second seal 70, including both the body 71 and the deflectable second annular lip 74, is configured to float radially and axially relative to the first end cap 30 of the outer tube assembly 90. Therefore, the body 71 and deflectable second annular lip 74 can move together with the radial outer surface 25 of the arm 24, which accommodates a greater magnitude of runout of the radial outer surface 25 than a fixed lip seal in which only the deflectable annular lip is accommodating the runout.

The felt ring 60 is sealingly arranged on the second radial surface 38 axially between the first seal 50 and the second seal 70. In an example embodiment, a second axial side 64 of the felt ring 60 is engaged with the first seal 50. In an example embodiment, the felt ring 60 is spaced apart from the first seal 50. In an example embodiment, the felt ring 60 sealingly and slidably engages the radial outer surface 25 of the inner arm 24.

Regarding the space 72 or cavity that contains the second seal 70, a radial outermost extent of the space 72 can be defined by the second radial surface 38, and an axial outermost extent of the space 72 can be defined by the second axial surface 40. The second radial surface 38 defines a radial outer stop or travel limiter for the second seal 70. A radial innermost extent of the space 72 can be defined by the radial outer surface 25 of the arm 24 and an axial innermost extent of the space 72 can be defined by the first axial side 62 of the felt ring 60. The first axial side 62 defines an axial inner stop or travel limiter for the second seal 70.

The first seal 50, second seal 70, and felt ring 60 together provide a sealing package the prevents the ingress of fluid and particle contamination into the linear actuator 100 from an outside working environment. In an example embodiment, the fluid and particle contamination can include rainwater, coolant, metal particles, dust, dirt, insects, or any other outdoor or industrial debris.

In an example embodiment, the second seal 70, defined as a floating seal, can accommodate excessive runout of the arm 24 that leads to a wobble or non-linear motion of the arm 24 relative to the outer tube 92. During such an excessive runout condition, an entirety of the second seal 70 is able to "follow" the inner arm 24 via the axial and radial clearances (via axial gap X3 and radial gap Y3) that are present within the space 72 that houses the second seal 70 to maintain a continuous 360-degree seal with the radial outer surface 25 of the arm 24. Factors that contribute to this erratic motion may include, but are not limited to, manufacturing tolerances of the arm 24, the nut 20, the lead screw 22, the coupling 16, the drive shaft 14, the speed reducer 12, and the electric motor 10.

In an example embodiment, the felt ring 60 can provide axial compliance for the second seal 70. Stated otherwise, the felt ring 60 can serve as a compressible spring element that helps facilitate axial movement or axial floating of the second seal 70. The axial compliance of the felt ring 60, which, in an example embodiment, is characterized by stiffness, could be adjusted to an extent that may allow the axial gap X1 to be eliminated so that the first axial side 62 of the felt ring 60 directly engages the second seal 70 while still allowing axial movement or axial floating. In an example embodiment, the axial compliance (or stiffness) of the felt ring 60 is less than the axial compliance (or stiffness) of the second seal 70 or the body 71 thereof. The felt ring 60 can block fluid and particle contamination that pass through a radial space defined by the previously described radial gap Y3 between the radial outermost extent of the second seal 70 and the second radial surface 38 of the stepped bore 32. The felt ring 60 can be constructed of any suitable material, including, but not limited to natural or synthetic fibers such as wool or acrylic.

In an example embodiment, the first seal 50, the felt ring 60, and second seal 70 are arranged adjacently to each other within the outer tube assembly 90. That is, the first seal 50 is installed directly adjacent to the felt ring 60 and the felt ring is installed directly adjacent to the second seal 70. As shown in FIG. 4, this proximity can also be represented via a line L2 that is parallel to and offset from the rotational/displacement axis AX1. The line L2 extends consecutively through the first seal 50, the felt ring 60, and the second seal 70. Stated otherwise, no other components reside between the first seal 50, the felt ring 60, and the second seal 70.

Turning to FIGS. 2 and 3, the linear actuator 100 includes a first connector 48 and a second connector 49 that define an effective length L1 or a linear span. The effective length L1: i) increases as the inner arm 24 moves in the first axial direction D1 away from the outer tube assembly 90; and ii) decreases as the inner arm 24 moves in the second axial direction D2 towards the outer tube assembly 90. The first connector 48 is defined by a bore 76 of the spherical rod end 26. The second connector 49 is defined by a bore 78 of a second end cap 98 that is sealingly fixed to a second open end 96 of the outer tube 92 which also serves as the second end of the outer tube assembly 90. The second end cap 98 sealingly closes the second open end 96, therefore the outer tube assembly 90 is open at the first end 44 and closed at the second end 96.

As shown within the solar panel arrangement 200 of FIG. 6, the first connector 48 can be pivotably mounted to a grounded post 86 (or a bracket 88 thereof), and the second connector 49 can be pivotably mounted to a solar panel 84. Extension or retraction of the arm 24 relative to the first end 44 of the outer tube assembly 90, which results in a respective increase or decrease of a magnitude of the effective length L1, causes the solar panel 84 to pivot about an axis AX2, which, in turn, adjusts an angle A1 of the solar panel 84.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A linear actuator, comprising:
- an outer housing;
- an inner arm disposed within the outer housing so as to be reciprocatingly movable relative to the outer housing;
- a seal arranged radially between the outer housing and the inner arm so as to prevent passage of fluid and particle contamination between the outer housing and the inner arm, the seal comprising:
- a first lip seal configured to sealingly engage the inner arm;
- a second lip seal configured to sealingly engage the inner arm; and
- a felt ring arranged axially between the first lip seal and the second lip seal.

2. The linear actuator of claim 1, wherein the second lip seal is configured as a radially floating seal.

3. The linear actuator of claim 2, wherein the second lip seal is configured as an axially floating seal.

4. The linear actuator of claim 2, wherein the felt ring is configured to sealingly engage the inner arm.

5. The linear actuator of claim 1, wherein the second lip seal is not fixed to the outer housing.

6. The linear actuator of claim 5, wherein the first lip seal is fixed to the outer housing.

7. The linear actuator of claim 1, wherein the outer housing further comprises a separate end cap fixed to an end of the outer housing, and:
- the seal is disposed radially between the separate end cap and the inner arm; and
- the separate end cap comprises a bearing configured to slidably receive the inner arm.

8. The linear actuator of claim 7, wherein the bearing is arranged axially adjacent to the seal.

9. The linear actuator of claim 8, wherein the first lip seal is disposed axially between the bearing and a first axial surface of the separate end cap.

10. The linear actuator of claim 9, wherein the second lip seal is disposed axially between the felt ring and a second axial surface of the separate end cap.

11. The linear actuator of claim 10, wherein the second lip seal is configured to float axially and is axially retained via the second axial surface of the separate end cap.

12. A linear actuator, comprising:
- an outer housing;
- an inner arm disposed within and extending outside of the outer housing, the inner arm and outer housing defining an effective length;
- an electric motor disposed within the outer housing, the electric motor configured to axially move the inner arm so as to selectively vary the effective length;
- a seal arranged between the outer housing and the inner arm, the seal configured to prevent passage of fluid and particle contamination between the outer housing and the inner arm, the seal comprising:
- a first seal configured to slidably and sealingly engage the inner arm, the first seal fixed to the outer housing;
- a second seal configured to slidably and sealingly engage the inner arm, and an entirety of the second seal configured to float radially relative to the outer housing; and
- a spring element separate from the first seal and the second seal, the spring element arranged axially between the first seal and the second seal so as springably support the second seal such that the entirety of the second seal floats axially relative to the outer housing via the spring element.

13. The linear actuator of claim 12, wherein the linear actuator is configured to adjust a tilt angle of a solar panel.

14. The linear actuator of claim 12, wherein the spring element is configured to slidably and sealingly engage the inner arm.

15. The linear actuator of claim 14, wherein the spring element directly engages the first seal.

16. The linear actuator of claim 14, wherein the first seal is a lip seal and the second seal is a lip seal.

17. The linear actuator of claim 14, wherein the electric motor is configured to move the inner arm via a threaded interface.

18. The linear actuator of claim 17, further comprising:
- a displacement axis of the inner arm;
- a line extending parallel and offset from the displacement axis; and
- the line passing consecutively through the first seal, the spring element, and the second seal.

19. A linear actuator, comprising:
- an outer housing;
- an inner arm disposed within the outer housing and extending from an end of the outer housing;
- an electromechanical powertrain disposed within the outer housing, the electromechanical powertrain configured to convert rotary motion to linear motion of the inner arm;
- a seal arranged radially between the outer housing and the inner arm so as to prevent passage of fluid and particle contamination between the outer housing and the inner arm, the seal comprising:
  - a first lip seal fixed radially and axially to the outer housing, the first lip seal configured to sealingly and slidably engage the inner arm;
  - a second lip seal configured to sealingly and slidably engage the inner arm, and an entirety of the second lip seal configured to move axially and radially relative to the outer housing such that a first side of the second lip seal is axially retained by the outer housing; and
  - a spring element separate from the first lip seal and the second lip seal, the spring element configured to springably support a second side of the second lip seal.

* * * * *